United States Patent
Parent

(12) 
(10) Patent No.: US 6,173,481 B1
(45) Date of Patent: Jan. 16, 2001

(54) WHEEL REMOVAL AND REASSEMBLY APPARATUS FOR BRAKE ACCESS ON HEAVY VEHICLES

(76) Inventor: Michael B. Parent, 4445 S. Pacific Hwy., Pheonix, OR (US) 97535

( * ) Notice: Under 35 U.S.C. 154(b), the term of this patent shall be extended for 0 days.

(21) Appl. No.: 09/104,151

(22) Filed: Jun. 23, 1998

(51) Int. Cl.$^7$ .................................................. B25B 27/19
(52) U.S. Cl. ................................................................ 29/273
(58) Field of Search ............................. 29/245, 273, 802, 29/894.3, 426.3, 402.08, 281.4; 254/134, DIG. 10; 414/426–429, 466

(56) References Cited

U.S. PATENT DOCUMENTS

| | | | |
|---|---|---|---|
| 955,790 | * | 4/1910 | Givens ..................................... 29/273 |
| 1,658,451 | * | 2/1928 | Long ........................................ 29/273 |
| 3,321,169 | * | 5/1967 | Fowler ..................................... 29/273 |
| 4,930,966 | * | 6/1990 | Chien ....................................... 29/273 |
| 4,949,448 | * | 8/1990 | Hebnes .................................... 29/273 |
| 5,426,841 | * | 6/1995 | Peterson .................................. 29/273 |

* cited by examiner

*Primary Examiner*—Robert C. Watson
(74) *Attorney, Agent, or Firm*—William H. Maxwell

(57) ABSTRACT

An apparatus for servicing the axles of heavy vehicles, providing aligned removal and reassembly of the wheel assembly for access to the brakes, wheel bearings and oils seals, to facilitate inspection and to ensure proper repair, characterized by a spindle coupling and a coaxially extending rail and carriage transport with wheel mounting adapters for alignment of the wheel assembly with the vehicle axle.

20 Claims, 6 Drawing Sheets

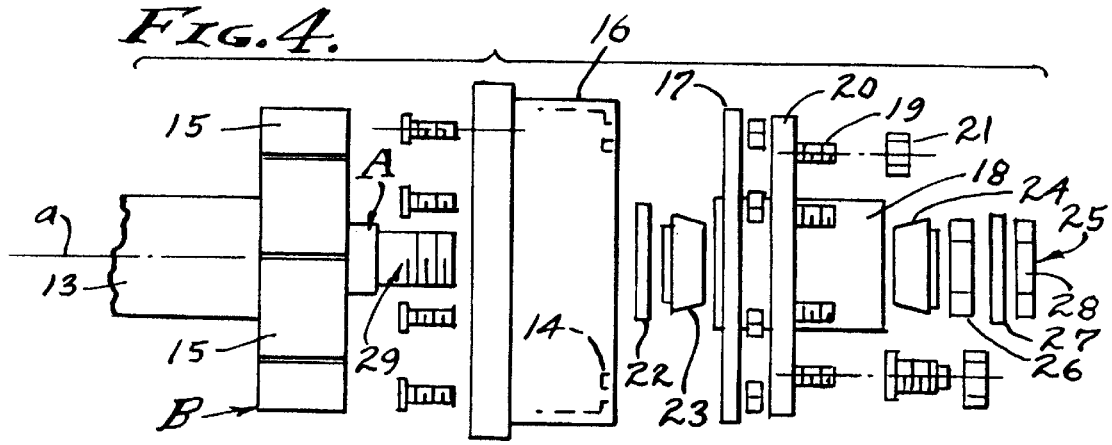
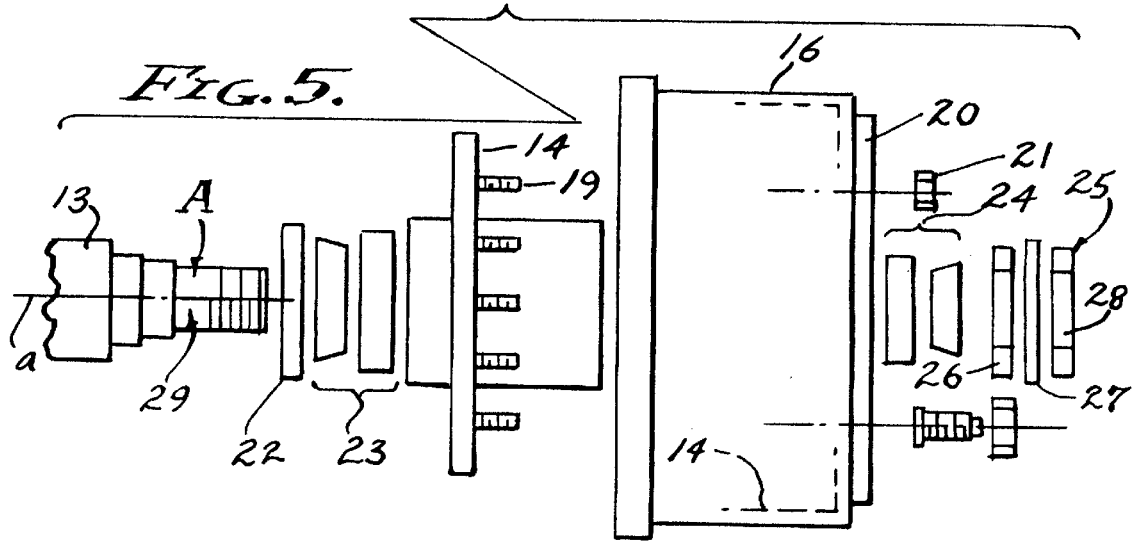

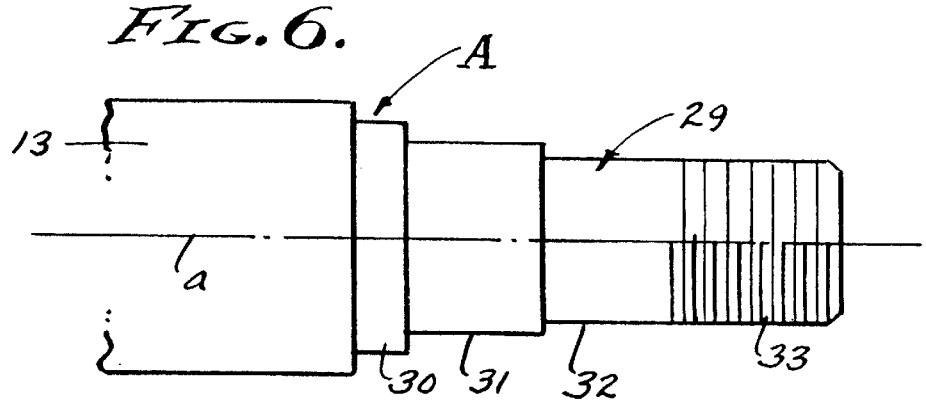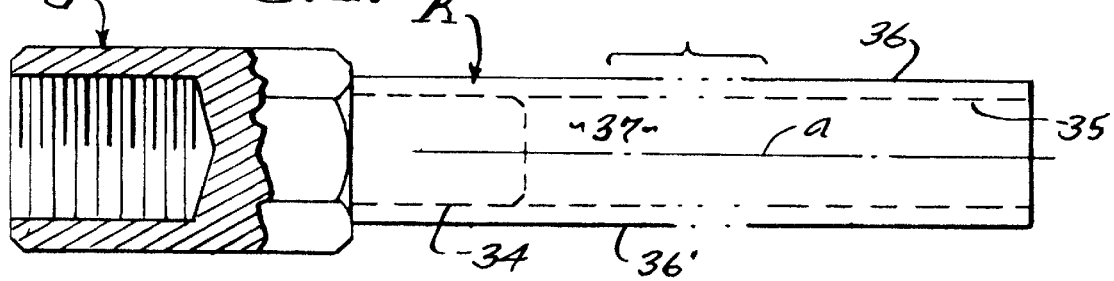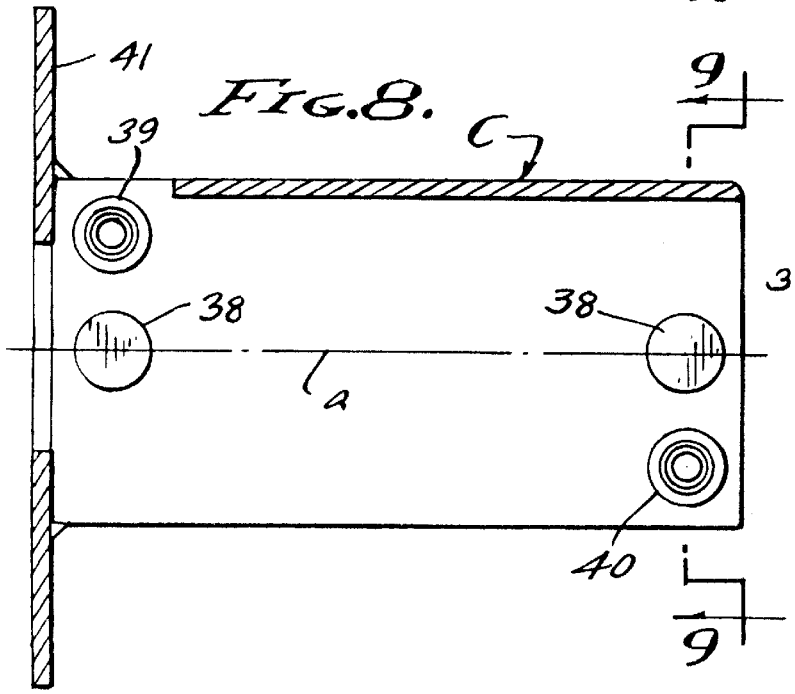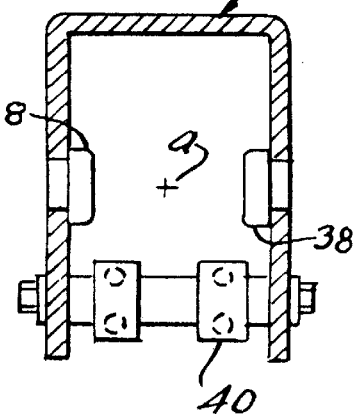

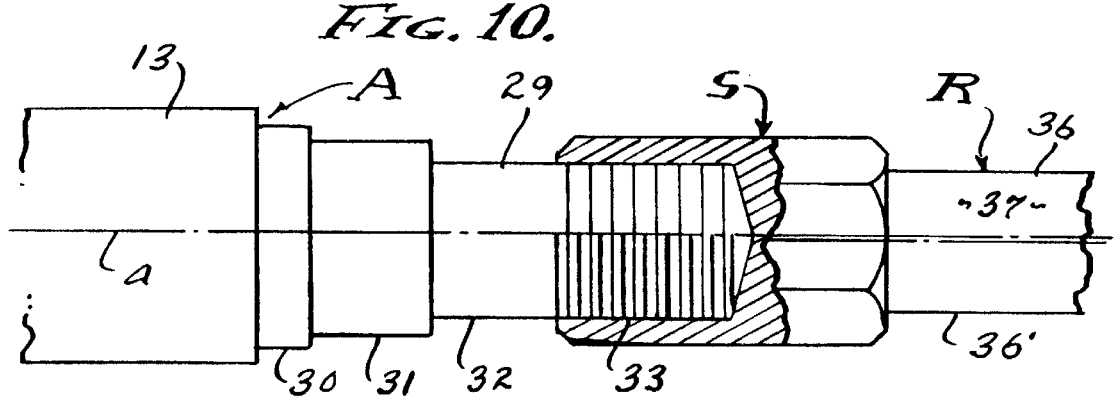
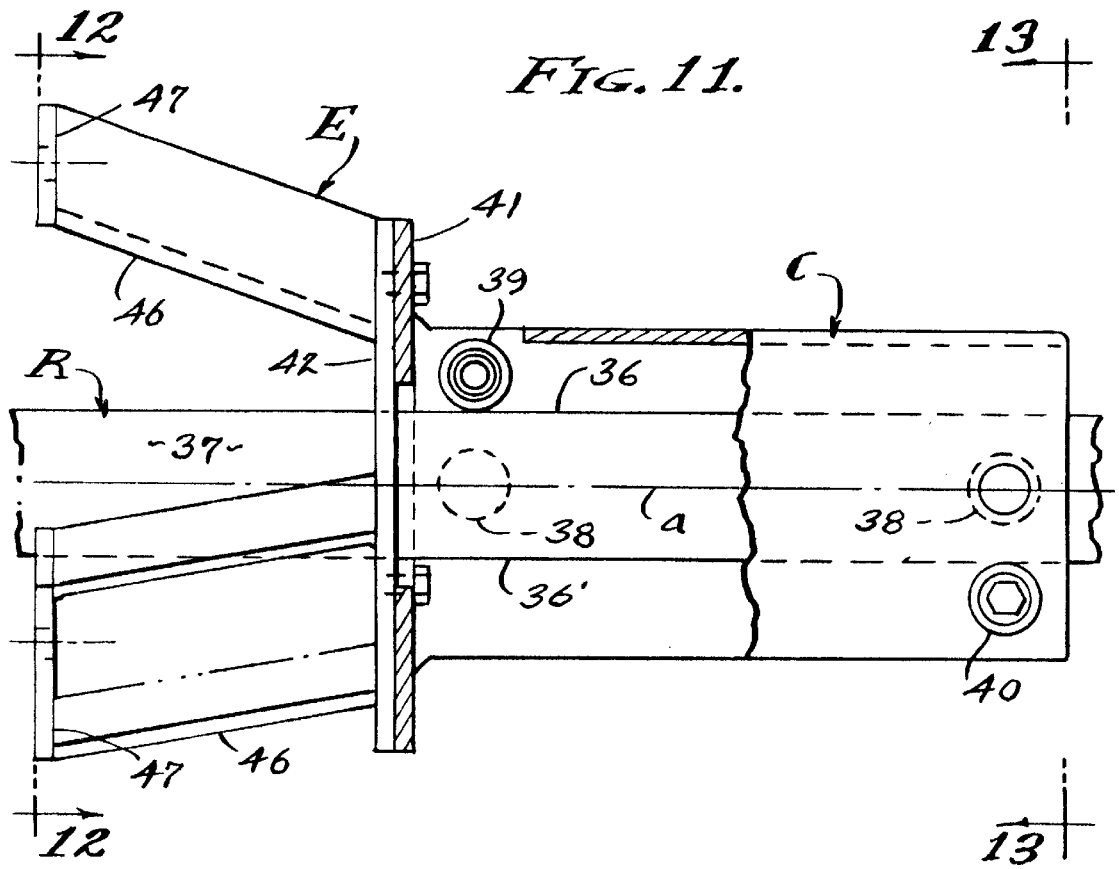

WHEEL REMOVAL AND REASSEMBLY APPARATUS FOR BRAKE ACCESS ON HEAVY VEHICLES

BACKGROUND OF THE INVENTION

This invention relates especially to commercial vehicles, and particularly to dual wheel brake maintenance on heavy trucks and traitors or the like. Brakes are a major maintenance problem in the operation of trucks and traitors. Unfortunately, due to weight, awkwardness and size of a set of dual truck wheels, brake maintenance is a strenuous and most difficult safety task one must perform. That is, the truck owner and/or operator must maintain safe brakes. To work upon the brake mechanism for example, one must remove the brake drum in order to gain access to the brake mechanism, there being two basic types of brake-to-hub arrangements; inboard and outboard. Also, the brake drum can be replaced by a brake disc. However, state of the art is for the most part of the drum brake type. And, the brake mechanism and wheels whether single or dual are applied to either drive or non-drive axles. For example, brake and wheel assemblies are applied to tractors as well as to trailers, and to steering axles as well. It is to be understood that it is the brake mechanism and the wheel assembly of whatever type to which this invention is directed, and attachment thereof by means of an axle or spindle or the equivalent.

The most common and older brake-wheel assembly is the inboard hub type wherein the brake drum mounts onto the inside of the hub, in which case the hub must be removed in order to gain access to the brake mechanism. The other most common and newer brake-wheel assembly is the outboard hub type wherein the brake drum mounts onto the outside of the hub, in which case the wheel with the brake drum must be removed in order to gain access to the brake mechansim, leaving the wheel hub in place on the axle or spindle. It is a general object of this invention to provide apparatus for access to brake mechanisms of each and all of the aforementioned types of brake-wheel assemblies.

Many if not most independent truck owners do their own brake maintenance. Optimum conditions for brake access and repair is thought to require a flat hard and smooth surface such as a concrete slab or horizontal floor upon which to park the truck axle to be inspected and/or repaired. However, inspection and/or repair must often be done on-site or on the road and away from the convenience of a suitable facility. Therefore, is is an object of this imnvention to provide an apparatus that is self sufficient and not reliant upon a specialized facility.

When doing repair work on inboard type wheel hubs, a prior art tool, if done on a concrete slab or steel plate, is a Wheel Dolly. The Wheel Dolly has a frame with a set of arms adjustable to cradle and support a wheel or set of duals. The Dolly has a set of three or four caster type wheels to roll upon a flat preferably horizontal surface for parallel placement of the dual wheel axis in alignment with the truck axle, for replaceable removal of the duals and exposure of the brake drum and internal brake mechanism. The caster type wheels require a smooth hard surface to roll upon , so as to retain parallelism and alignment of the duals and wheel hub with the axle. A problem arises when the concrete slab and/or steel plate is not parallel with the axle, wheel bearing and oil seal. Inclination of the truck axle is inherent when lifted at one side by a jack, and the angular displacement when lifted is difficult to compensate for and adversely affects reassembly due to inherent misalignment. Furthermore, lateral alignment cannot be assured, and this is the primary cause of bearing, oil seal and thread damage during re-assembly. Therefore, it is an object of this invention to attach a brake mechanism access apparatus directly to the truck or trailer axle to coaxially cantilever therefrom.

An alternate method of removal of a set of duals, without the use of the aforesaid Wheel Dolly, is to park the duals upon a smooth hard surface such as a concrete slab or sheet of steel. A jack is placed under the truck axle in order to raise the duals high enough to smear a layer of heavy oil or grease beneath the tires. The jack is then lowered so as to permit the tires to carry the weight of the duals, and with the brake adjustment backed off and the outer wheel bearing removed, the dual wheel assembly is slid on said oil or grease and off the axle or spindle. This method is resorted to at a place of breakdown and is often performed by road-side service. However, this alternate method is messy and inadvisable, since oil or grease and brake lining do not mix. Furthermore, alignment of the oil seal and wheel bearing with the axle or spindle is not ensured and in fact unlikely to be attained. In practice, horizontal and vertical alignment is visual through the center of the hub while pushing the duals back onto the axle or spindle. Also, the axis of the hub assembly is often eccentric with respect to the axle or spindle due to likely rotation of the dual wheel assembly of either or both tires, and because one tire is often smaller than the other. Tire wear, cupped treads and tire air pressure also affects alignment. And, missalignment is the primary cause of damage to the seal, wheel bearings and axle or spindle threads during re-assembly.

On newer trucks fitted with outboard hubs, the hub does not have to be removed in order to gain access to the brake drum and internal brake mechanism. However, this improvement over inboard hubs is still awkward and the wheel bearings and oil seal are not exposed to be inspected and/or repaired, unless the wheel hub is removed. The proceedure for gaining access to the wheel bearings and oil seal is solved with the present invention by raising the dual wheels off the ground, removing the wheel or dual wheels, and then by removing the inner lug nuts. With the truck brake slack adjuster backed off the brake drum can then be removed to expose the hub and removal of the wheel bearing lock-nut assembly, followed by removal of the outer wheel bearing then the hub and inner wheel bearing, thereby exposing the oil seal for inspection and/or repair (replacment),it being an object of this invention to provide access to both the outer and inner wheel bearings and particularly to the innermost oil seal. With the present invention, access to all parts of the hub, wheel bearings and brake assembly is attained, regardless of the type of commonly employed truck axles.

It is an object of this invention to temporarily remove a wheel or dual wheels laterally from an axle or spindle and to support the same in coaxial alignment therewith, preparatory to re-assembly. In carrying out this invention, the truck axle or spindle is extended by a rail member coaxially affixed thereto and upon which a carriage is releasably adapted to the wheel or dual wheels of the truck. In practice, there is an adapter affixed to the carriage and releasably secured to the wheel studs, for removal of the wheel and brake drum, so as to expose the internal brake mechanism and its shoes. Thimble lug nuts are used for extension of the studs to attain this attachment, whereby the carriage is enabled to transport the wheel and drum assembly out of and again into aligned position, and at all times in coaxial relationship with the axle or spindle.

It is another object of this invention to prevent rotation of the wheel or dual wheels when affixed to the carriage, and to this end the carriage is prevented from rotating upon the aforementioned extension rail upon which it travels laterally to and from the terminal end of the truck axle or spindle. In practice, the extension rail is polygonal, preferably rectangular in cross section, and over which the carriage travels upon supporting rollers and/or guides or the like.

The cantilevered rail is coaxially centered with respect to the axis of the truck axle or spindle and in practice is temporarily secured by threaded engagement to the existant end portion of said axle or spindle, replacing the normal lock nut assembly that retains the outer bearing. When lateral extension of the rail is brief, the rail can be totally cantilevered without additional support, for example when the wheel and drum assembly is removed at close range, and the carriage used for short travel and alignment only. However, when lateral transport is extreme (as shown in the drawings) for working access to the brakes and bearings and seal, then it is an object of this invention to stabilize the extension rail by providing a remote support which is vertically adjustable.

It is also an object of this invention to enable unobstructed access to the seals and bearings of the axle assembly, and to this end the aforesaid extension rail is removable from and replaceable upon the adapter that is left temporarily threaded onto the axle spindle. Accordingly, when the wheel or duals are removed onto the outer extending portion of the supporting rail, the inner end of the rail can be lifted out of its supported engagement on the adapter so as to be shifted away from the axle assembly, thereby to clear the area for inspection and/or work upon the seals and bearings.

SUMMARY OF THE INVENTION

Trucking involves vehicle maintenance, including in particular axle and brake inspection and repair. Heretofore, difficulty is experienced by the repair person in the handling of heavy wheels and especially dual wheel brake drum assemblies and their alignment with the axle spindle upon re-assembly. Misalignment is a major cause of damage to bearings and oil seals! Also, inner bearing and oil seal inspection is often precluded in the practice of present day proceedures. Accordingly, it is a general object of this invention to provide a manageable simple apparatus of compact structurally sound design that is convenient to install for the temporary support, removal and aligned replacement of truck wheel and brake drum assemblies. The wheel hub may or may not be part of the assembly.

This invention is comprised of an apparatus characterized by an extended rail that coaxially projects the axis of the axle spindle and upon which rail a carriage attaches to the brake drum and wheel assembly for transport thereof laterally so as to expose the truck brake mechanism and axle features for inspection and repair. Adapters are provided for rail attachment to the axle spindle, and for wheel attachment to the carriage. Antifriction rollers are employed for carriage to rail support, facilitating manual operation of the apparatus. And, said rail is removable from the adapter for clear access to the axle seals and bearings.

Having described only the preferred forms and applications of my invention, I do not wish to be limited or restricted to the specific details herein set forth, but wish to reserve to myself any modifications or variations that may appear to those skilled in the art as set forth within the limits of the following claims.

THE DRAWINGS

FIGS. 4 and 5 are exploded views taken along axis a of the truck axle, FIG. 4 illustrating the essential elements of a typical inboard axle assembly, and FIG. 5 illustrating the essential elements of a typical outboard axle assembly.

FIG. 6 is a fragmentary view of the spindle end portion of the truck axle, the bearings and oil seal being removed.

FIG. 7 is a longitudinal side view of the rail member of the apparatus.

FIG. 8 is a longitudinal sectional view of the carriage member of the apparatus, and FIG. 9 is an end sectional view taken substantially as indicated by line 9—9 on FIG. 8.

FIG. 10 is a fragmentary view of the apparatus, illustrating the coupling of the axle spindle and the rail member.

FIG. 11 illustrates the installation of the carriage and rail members, with the adapter member attached.

Figure 12:
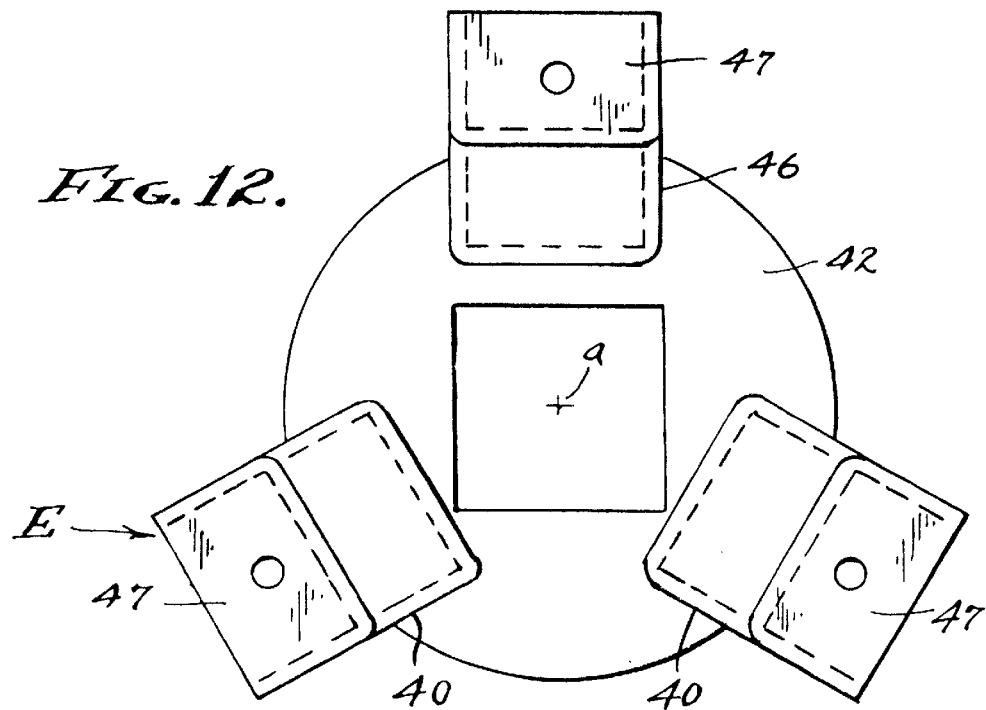
Figure 13:
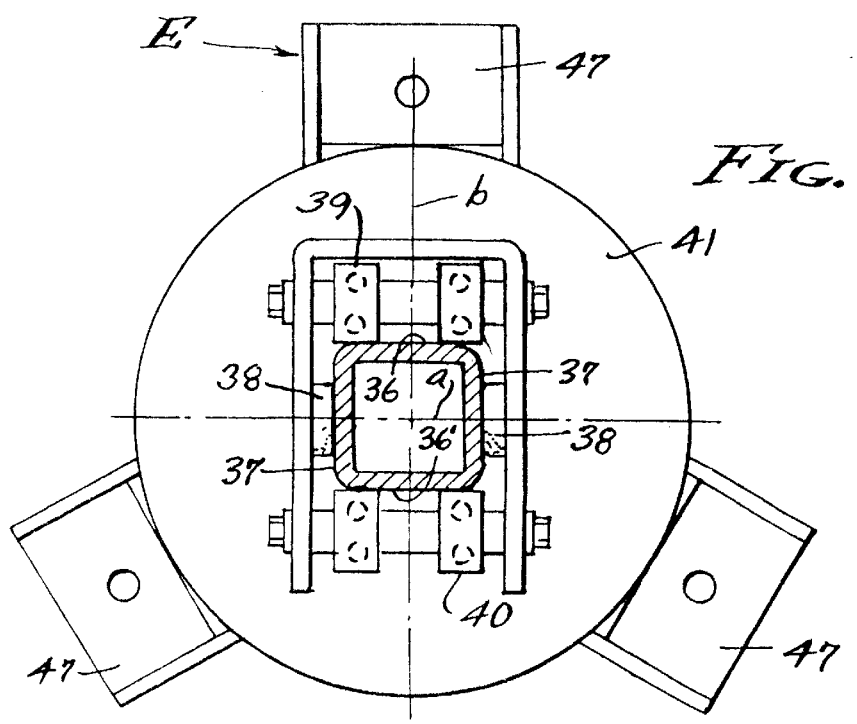

FIGS. 12 and 13 are opposite end views of the carriage and adapter assembly, taken as indicated by lines 12—12 and 13—13 of FIG. 11, FIG. 12 showing the adapter before installation over the rail member, and FIG. 13 showing roller engagement of the carriage upon the rail member.

Figure 14:
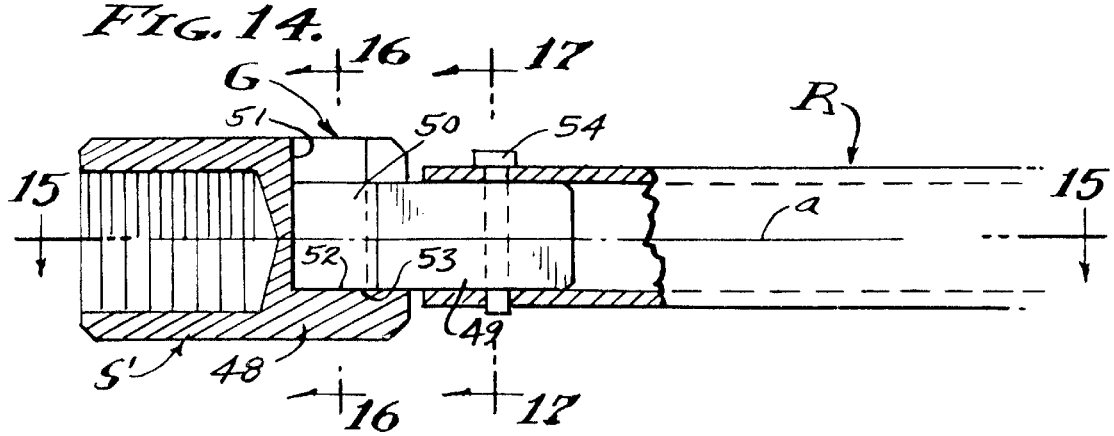

And, FIGS. 14–17 illustrate a releasable hinged adapter embodiment, FIGS. 14 being a top view similar to FIG. 7, and FIGS. 15–17 being sectional views taken as indicated by lines 15—15, 16—16 and 17—17 on FIG. 14.

PREFERRED EMBODIMENT

Figure 1:
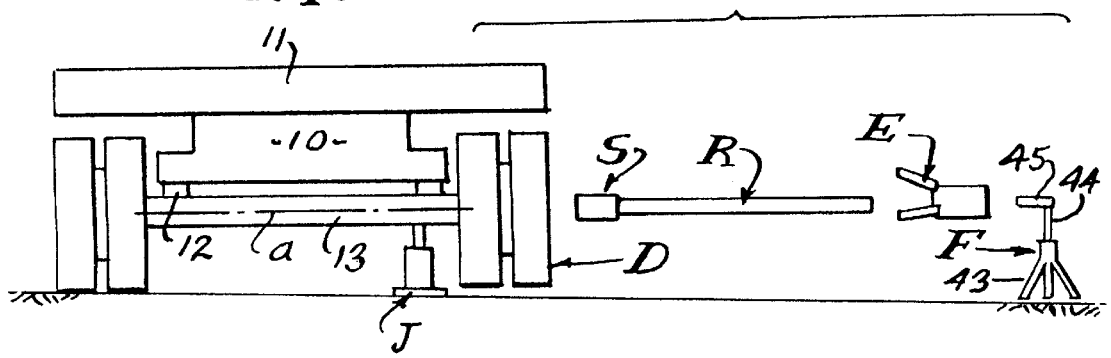
FIG. 1 is a rear end view of a typical truck with a dual axle lifted by a jack preparatory to a repair, being an exploded view illustrating the elements of the Removal And Re-assembly Apparauts of the present invention.
Figure 2:
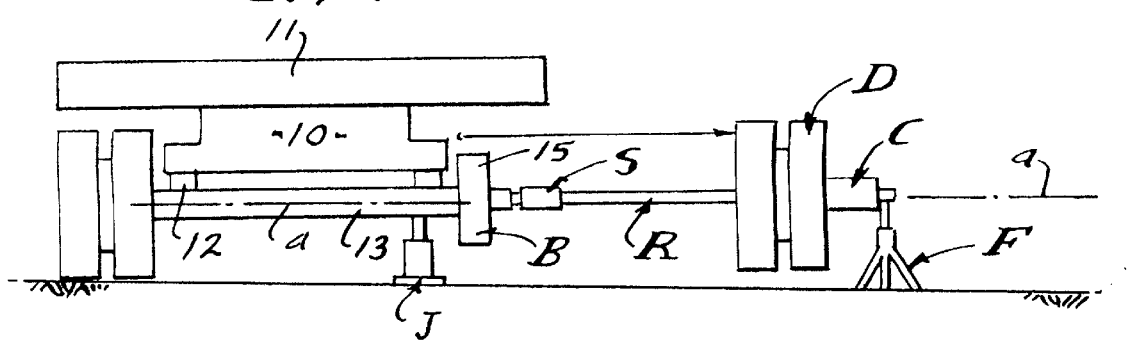
FIG. 2 is a rear view of the truck shown in FIG. 1, with the Apparatus installed and a set of dual wheels removed, for access to the brake mechanism, bearings and oil seal.
Figure 3:
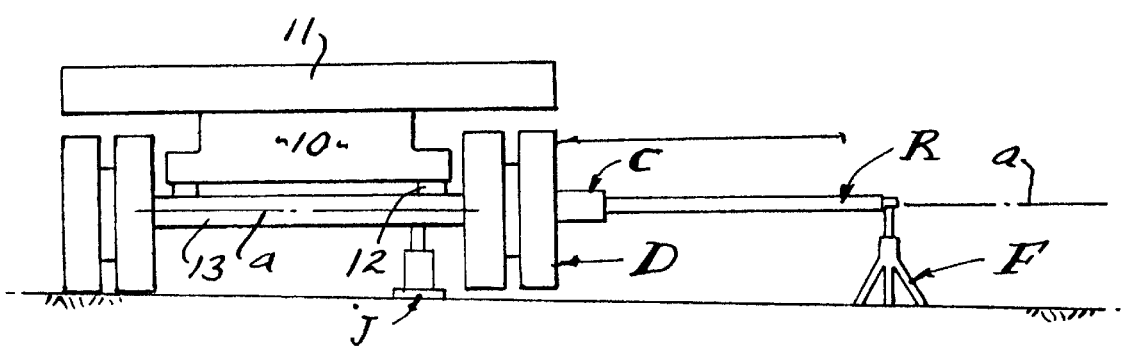
FIG. 3 is a rear view of the truck shown in FIGS. 1 and 2, illustrating replacement of the set of dual wheels aligned by the Apparatus installed as shown in FIG. 2.

Referring now to the drawings, a typical truck T is comprised of a chassis 10 upon which there is a load carrying bed 11 or the like and supported by a suspension system 12 from an axle housing 13. As shown in FIGS. 1–3 dual wheels D operate at opposite ends of the axle housing 13, and at each of which there is a brake mechanism B carried by a flange member (not shown) affixed to the axle housing. The brake shoes 15 as shown in FIGS. 2 and 4 are positioned on the axle housing against rotation by said flange member, and it is the brake mechanism B and primarily the brake shoes 15 that are to be exposed for inspection and/or repair by replaceably removing the dual wheels D laterally from their normal operating position as shown in FIG. 1 (see FIG. 2). As shown in FIG. 2 a pair of duals D has been removed laterally from the axle housing 13, thereby exposing the brake shoes 15. And, in FIG. 3 said pair of duals D has been replaced in normal operating position on the axle housing 13.

Referring now to FIGS. 4 and 5 of the drawings, the two basic types of state of the art brake-to-wheel assemblies are shown, and which include generally the following components: The older and first type is the inboard-hub attachment of the brake drum 16 as shown in FIG. 4, wherein the inside of the flange 17 at the inner end of the hub 18 attaches to the inwardly turned outer flange 14 of the brake drum. Wheel studs 19 carried by the flange 17 or a separate flange 20 (as shown) provides for wheel attachment with lug-nuts 21. The hub-bearing-seal assembly is comprised of (sequentially) an innermost seal 22, an inner bearing 23, the hub 18, an outer bearing 24, and a lock-nut assembly 25 which includes an adjustment nut 26, a lock ring 27, a lock nut 28; and outside of which there is a hub cap enclosure (not shown). The inner and outer bearings 23 and 24 are of the conventional tapered roller type for radial thrust between inner and outer races arranged in opposition for axial thrust therebetween, such bearing units being installed over the axle A and threaded to the spindle 29 thereof. It is to be understood that the axle A and/or spindle 29 can vary with the axle construction, whether it be a drive axle or not, or a steering axle or trailer axle. As shown and described herein, the spindle 29 is the tapered outer end portion of the axle A over which the brake-to-wheel assembly is applied and secured. The newer and second type of outboard-hub attachment of the brake drum 16 is shown in FIG. 5 wherein the outside of flange 20 attaches to the inturned outer flange 14 of the brake drum; the hub-bearing-seal assembly (23–28) being the same as in the first type hereinabove described.

Referring now to FIG. 6 of the drawings, the axle A terminates at each end in a spindle 29 that rotatably carries the wheel hub 18 on the aforesaid bearings 23 and 24, a simple steering and/or trailer axle being shown. It is to be understood that a drive axle includes an internal shaft (not shown) coupled to the wheel to be driven. A prevailing feature however is the spindle 29 and bearings 23–24 that rotatably carry the wheel independently of the driving axle shaft. Accordingly, the spindle 29 is a continuation of the axle A and includes an innermost stepped seat 30 for the oil seal 22, a stepped seat 31 for the inner bearing 23, a stepped seat 32 for the outer bearing 24, and an externally threaded outer end coupling portion 33 for the lock-nut assembly 25 and particularly for receiving and supporting the rail R as next described. In practice, the axle A and spindle 29 are integral and disposed on a central axis a to which the rotating wheel or duals D and rail R of the present invention are positively aligned.

Referring now to FIGS. 7 and 8 of the drawings, the Wheel Removal And Reassembly Apparatus invovles a spindle adapter means S for attachment of the rail R to the axle A, and in FIG. 11 a carriage C for transport along the rail, and a means E for attachment of a wheel or the duals D to be carried laterally by the carriage. In practile, the spindle adapter means S provides a rigid support that extends the rail R coaxially along the axis a of the axle A so as to cantilever laterally and outwardly therefrom. And, carriage C provides a movable wheel assembly support (bascally manual) that replaceably transports said wheel assembly from and back to its installed position on the spindle 29 of the axle A. Alignment is precise, and transport can be by rack-and-pinion and/or motor driven (not shown).

The spindle adapter means S is a coupling that is secured to the end portion of the spindle 29 where it is fixedly attached for rigid support. In carrying out this invention, the coupling is threadedly engaged onto the spindle and will vary with the axle construction to which the adapter is applied, as circumstances require. As shown in FIGS. 7 and 10, the adapter means S is comprised of a hexagonal body that has wrench engagement and embraces spindle 29 to project axially and is affixed to the rail R, as by a force-fit square plug 34 (see FIG. 7). The adapter means S projects from the inner end of rail R and is internally threaded for releasable coupled engagement onto the externally threaded outer end portion 33 of spindle 29 (see FIG. 10).

The rail R is a straight elongated member of square cross section that supports the carriage C so that the carriage is transported laterally from and to the axle spindle 29. The rail R is essentially a beam that can vary widely in its structural design. That is, the rail can be a bar or tube that affords stiffness to resist bending, and of a cross section that will either permit or prevent rotation of the carriage thereon as may be required. For example, it may be desired that the carriage revolve on its axis a, in which case the rail is of round cross section over which the carriage slides and revolves concentrically. Or, as is preferred and shown, the carriage is of polygonal rectangular square cross section having parallel top and bottom transversely planar ways 36 and 36' for vertical axis b support and alignment, and parallel opposite sides 37 and 37' slidably engaged with the rail and preferably by fore and aft Nylon guides 38 for horizontal positioning and alignment (see FIG. 13). The outer end portion of the rail is provided with a squared socket 35 for rotationally stabilized support as later described.

The carriage C configuration can vary widely dependant upon the structure of the rail R and whether it is to revolve or not. It is essential that the carriage C has a central axis held coincidental with the aforsaid axis a, for the purpose of alignment with the extended axes of the axle A and spindle 29 from either side of the truck. It is preferred that the rail R be polygonal as hereinabove described, in which case the carriage C is supported for rectilinear transport coaxially with axis a by alignment means in the form of transversely spaced anti-friction bearings 39 and 40, preferably spaced roller bearings engaged with the top and bottom ways 36 and 36'. The fulcrum bearing 39 is at the front top end of the carriage body, whereas the resistance bearing 40 is at the back bottom end of the carriage body, the former bearing downward and the latter bearing upward as clearly shown in FIG. 11 of the drawings. The front inner end of the carriage is provided with a forwardly disposed adapter mounting plate 41 normal to the central axis of the carriage and from which a wheel attachment means E projects forwardly and inwardly over the rail R to bear the weight of the wheel or duals D being supported; thereby establishing a first class lever system with the fulcrum bearing 39 intermediate the resistance bearing 40 and the aforesaid wheel or dual load. In carrying out this invention, one of the bearings 39 or 40 is eccentrically adjusted (not shown) so as to coaxially align the central axis of the carriage C with axis a of the axle spindle 29.

The attachment means E for wheel to carriage securement is comprised of a mounting adapter which varies widely dependant upon wheel diameter and wheel stud pattern, there being and adapter for each wheel diameter and stud pattern as may be required. The front inner end of the carriage-to-wheel adapter of means E is provided with a wheel mounting plate 42 complementary to the above described plate 41 and disposed normal at a right angle to the central axis a and adjusted to be coincidental with said axis a. Divergent legs 46, shown as three legs forming a tripod wheel support with co-planar stud receiving pads 47 rigidly placed thereby to match the stud pattern of the wheel to be mounted. The pads 47 are secured to the wheel or duals D by means of the wheel studs 19 (thimble lug nuts) and lug-nuts 21. Since the wheel stud pattern is concentric with the axis a, then too is the coupling thereof to the carriage axis coincidental with the rail axis, all of which axes are coaxial with the axis a.

Rewferring now to FIGS. 1 to 3 of the drawings, the extended rail is supported by a vertically adjustable means F in the form of a stand having a base 43 and a screw jack 44 from which a horizontal lug 45 projects along the extended axis a from a transverse pivotal axis at the top of the jack 44 and loosely fitted for articulation into the aforesaid square socket 35 at the terminal end of the rail R. As is clearly shown, the stand F is adjusted so that the axis a and rail R are free to swivel at whatever inclination, extending with little or no deflection regardless of irregularities of the underlying supporting surface.

Figure 15:
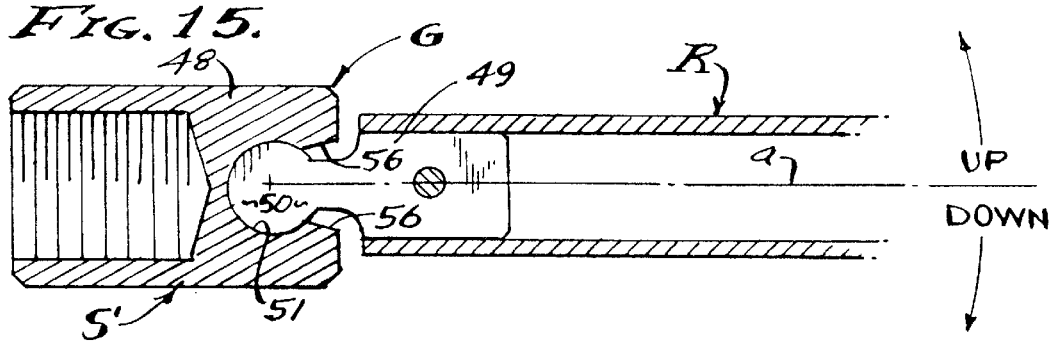
Figure 16:
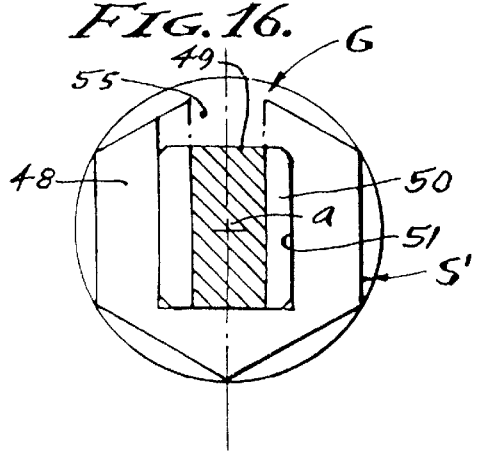
Figure 17:
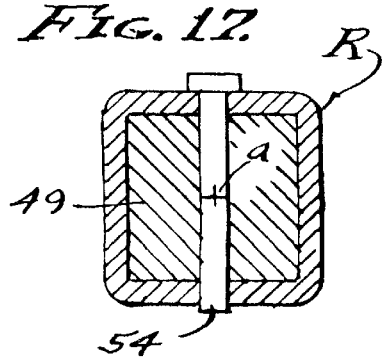

Referring now to FIGS. 14–17 of the drawings, a hinged rail-to-adapter releasable coupling means G is shown, whereby the rail R can be hingedly connected to or removed from the adapter S' while leaving said adapter in place threaded to the axle spindle 29. Accordingly, the hinged adapter permits adjustment of the outer end of the rail so as to be lowered to rest the suspended hub mounted to the carriage on the ground or stand or the like for the removal of the rail and to gain access to the inner bearing seal and brake drum, without the necessity of lowering the axle of the vehicle. Re-alignment of the axis a is regained by raising the rail after seal and bearing repair has been made. The spindle S' is a two-piece coupling comprised of a fixed support member threadedly engaged over the end portion 33 of the spindle 29, and a removable member 49 releasably affixed to said support member. As shown in FIGS. 14–16, the support member 48 is comprised of a hexagonal body that has wrench engagement and threadedly embraces spindle 29 to project outwardly along axis a, and is releasably affixed to the rail R by a sliding fitted horizontally disposed plug 50 received in a complimentary socket 51. In practice, the socket 51 is a laterally faced open cylinder formed in the support member 48, with a bottom 52, and the plug 50 is a mating cylinder formed on the removable member 49, with a bottom face 53 adapted to seat on said bottom 52. The plug 50 is removable from and replaceable into the socket 51. The removable member 49 is releasably secured to project from the inner end of the rail R by means of a sliding fit into the rail and secured by a pin 54. A feature is the slot 55 access of the member 49 into the member 48 (see FIG. 16) preventing rotation of the cylindrical plug 50 held in alignment with the axis a by the bottom support of lug 50 (see FIG. 14). That is, opposed walls 56 of the slot 55 limits position of the member 49 (see FIG. 15).

OPERATION

FIGS. 1–3 illustrate a typical brake repair environment with the axle housing 13 inclined by means of a jack J so as to lift the duals D at one side of the truck T. In this condition, the hub 18 is removed with the dual wheel and brake drum assembly for access to and removal of the wheel bearings 23 and 24 and of the oil seal 22. The spindle adpater S is screwed onto portion 33 of spindle 29, and the rail R assembled therewith by threaded engagement is rotatably stabilized by engagement of the squared lug 45 in the squared socket 35. The carriage C is then installed over the rail R for guided rolling engagement thereon, and stabilized by means of the vertically adjustable stand F. Lug nuts are removed from the wheel studs corresponding to the adapter means S stud hole pattern and the carriage C is rolled forwardly inward so as to engage the adapter plate 42 with the wheel stud plate whereupon attachment is made by means of lug nuts, using thimble lug nuts as may be required, thereby supporting the dual wheel and brake assembly upon the carriage C. The conventional truck brake slack adjuster is backed off in order to release the brake drum 16 from the brake shoes 15, and the hub 18 and dual wheel and brake drum assembly is now prepared for rolling transport laterally from the internal bearing races, oil seal and brake mechanism.

The dual wheel assembly remains coaxial with axis a during the entire transport operation while completely exposing the brake mechanism and inner and outer bearings 23 and 24 and oil seal 22 for inspection and/or repair or replacement. In the case of the older first type of inboard-hub attachment, the hub 18 is removed with the wheel and brake assembly. In the case of the newer second type of outboard-hub attachment, the hub 18 can remain on the axle spindle 29, however it too can remain assembled with the wheel and brake drum assembly, dependant upon the manner of stud attachment. During replacement of the dual wheel and brake drum assembly, all axes remain aligned as controlled by the adapter means S and rail R attachment coaxial with axis a of the axle spindle 29. The dual wheels can be moved from the rail R for remote service thereto and replaced in alignment thereon as circumstances require.

Having described only the preferred forms and applications of my invention, I do not wish to be limited or restricted to the specific details herein set forth, but wish to reserve to myself any modifications or variations that may appear to those skilled in the art as set forth within the limits of the following claims.

I claim:

1. A wheel removal and assembly apparatus for brake-bearing-seal access on vehicles having an axle with a spindle carrying a hub mounting a wheel on a rotational axis and with an outer end threaded portion for receiving a lock-nut to retain the hub engaged with said bearing and seal, removal of the lock-nut for removal of the hub from the spindle exposing said outer end threaded portion of the spindle, the apparatus including;

an elongated rail formed about a straight axis and having ways parallel with said axis and extending between inner and outer ends of the rail, a spindle adapter means for receiving the rail on an axis of and for releasable coaxial engagement onto the threaded outer end of the axle spindle, said spindle adapter being coaxially affixed to the inner end of the rail, a carriage supported by alignment means engaged upon said ways for rectilinear transport between the inner and outer ends of the elongated rail, and a wheel attachment means at the front of the carriage for releasably mounting of the wheel to the carriage coaxially with the aforesaid axes.

2. The wheel removal and reassembly apparatus as set forth in claim 1, wherein the elongated rail has a socket at its outer end, there being means engaged in said socket for support of the rail.

3. The wheel removal and reassembly apparatus as set forth in claim 1, wherein the elongated rail has a socket at its outer end, there being means in the form of a vertically adjustable stand engaged in said socket for positioned support of the rail.

4. The wheel removal and reassembly apparatus as set forth in claim 1, wherein the alignment means is comprised of anti-friction bearings enaged upon said ways for lateral transport from and to the spindle of the vehicle axle.

5. The wheel removal and reassembly apparatus as set forth in claim 1, wherein the ways of the elongated rail are transversely planar, and wherein the alignment means is comprised of transversely spaced anti-friction bearings for rotatably stabilized rolling engagement upon said ways for lateral transaport from and to the spindle.

6. The wheel removal and reassembly apparatus as set forth in claim 1, wherein the elongated rail has parallel top and bottom ways which are parallel with the axis thereof, and wherein the alignment means is comprised of longitudinally spaced anti-friction bearings engaged upon said top and bottom ways respectively for lateral support from and to the spindle.

7. The wheel removal and reassembly apparatus as set forth in claim 1, wherein the elongated rail has parallel top and bottom ways which are parallel with said axis thereof, and wherein the alignment means is comprised of longitudinally spaced front and back anti-friction bearings engaged upon said top and bottom ways respectively for lateral transport from and to the spindle of the vehicle axle, the front bearings bearing downward upon the top ways and the back bearings bearing upward against the bottom ways thereby establishing a first class lever support of the adapter means at the front of the carriage.

8. The wheel removal and reassembly apparatus as set forth in claim 4, wherein the elongated rail has opposite sides extending between its inner and outer ends and parallel with said axis thereof, and wherein the carriage has guides slidably engaged with the opposite sides of the rail for positioned alignment with said axis of the rail.

9. The wheel removal and reassembly apparatus as set forth in claim 5, wherein the elongated rail has opposite sides extending between its inner and outer ends and parallel with said axis thereof, and wherein the carriage slidably engages with opposite sides of the rail for positioned alignment with said axis of the rail.

10. The wheel removal and reassembly apparatus as set forth in claim 6, wherein the elongated rail has opposite sides extending between its inner and outer ends and parallel with said axis thereof, and wherein the carriage has guides slidably engaged with the opposite sides of the rail for positioned alignment with said axis of the rail.

11. The wheel removal and reassembly apparatus as set forth in claim 7, wherein the elongated rail has opposite sides extending between its inner and outer ends and parallel with said axis thereof, and wherein the carriage has guides slidably engaged with the opposite sides of the rail for positioned alignment with said axis of the rail.

12. A wheel removal and reassembly apparatus for brake-bearing-seal access on vehicles having and axle with a spindle carrying a hub with a wheel mounting flange having studs mounting a wheel on a rotational axis and with an outer end threaded portion for receiving a lock-nut to retain the hub engaged with said bearing and seal, removal of the lock-nut for removal of the hub from the spindle exposing said outer end threaded portion of the spindle, the apparatus including;
   an elongated rail formed about a straight axis and having ways parallel with said axis and extending between inner and outer ends of the rail,
   a spindle adapter means for receiving the rail on an axis of and for releasable coaxial engagement onto the threaded outer end of the axle spindle, said spindle adapter being coaxially affixed to the inner end of the rail,
   a carriage supported by alignment means engaged upon said ways for rectilinear transport between the inner and outer ends of the elongated rail and having a forwardly disposed adapter mounting plate normal to the central axis of the carriage,
   and a wheel attachment means comprised of a wheel mounting plate secured to said adapter mounting plate with at least one forwardly extending leg having a pad with a stud opening complementary to and for receiving and securing a wheel mounting flange stud for releasable wheel attachment to the carriage coaxially with the aforesaid axes.

13. The wheel removal and reassembly apparatus as set forth in claim 12, wherein the wheel mounting plate of the wheel attachment means is complementary to and replaceable to the adapter mounting plate of the carriage.

14. The wheel removal and reassembly apparatus as set forth in claim 12, wherein the wheel attachment means has a plurality of radially and forwardly extending legs and pads disposed in a common plane normal to and concentric with the carriage axis and coaxial with the aforesaid axes.

15. The wheel removal and reassembly apparatus as set forth in claim 13, wherein the wheel attachment means has a plurality of radially and forwardly extending legs and pads disposed in a common plane normal to and concentric with the carriage axis and coaxial with the aforesaid axes.

16. A wheel removal and reassembly apparatus for brake-bearing-seal access on vehicles having and axle with a spindle carrying a hub mounting a wheel on a rotational axis and with an outer end threaded portion for receiving a lock-nut to retain the hub engaged with said bearing and seal, removal of the lock-nut for removal of the hub from the spindle exposing said outer end threaded portion of the spindle, the apparatus including;
   an elongated rail formed about a straight axis and having ways parallel with said axis and extending between inner and outer ends of the rail,
   a spindle adapter means for threadedly receiving the rail on an axis of and for releasable coaxial engagement onto the threaded outer end of the axle spindle,
   a coupling means for releasably hinging the spindle adapter to the inner end of the rail,
   a carriage supported by alignment means engaged upon said ways for rectilinear transport between the inner and outer ends of the elongated rail,
   and a wheel attachment means at the front of the carriage for releasably mounting of the wheel to the carriage coaxially with the aforesaid axes.

17. The wheel removal and reassembly apparatus as set forth in claim 16, wherein the coupling means is comprised of a socket in the spindle adapter and a plug on the rail slidable into and positioned by the socket.

18. The wheel removal and reassembly apparatus as set forth in claim 16, wherein the coupling means is comprised of a horizontally disposed laterally opening socket in the spindle adapter and a complementary mating plug on the rail slidable into and having bottoming engagement in the socket for axially positioning the rail.

19. The wheel removal and reassembly apparatus as set froth in claim 16, wherein the coupling means is comprised of a horizontally disposed laterallyopening socket in the spindle adapter and a complementary mating plug on the rail slidable into and having bottoming engagement in the socket for axially positioning the rail, there being a slot in the adapter and opening into said socket for access of the plug into said socket.

20. The wheel removal and reassembly apparatus as set forth in claim 16, wherein the coupling means is comprised of a horizontally disposed laterally opening socket in the spindle adapter and a complementary mating plug on the rail slidable into and having bottoming engagement in the socket for axially positioning the rail, there being a a slot in the adapter and opening into said socket for access of the plug into said socket and with side walls engaged with and laterally positioning the plug and rail on said straight axis.

\* \* \* \* \*